UNITED STATES PATENT OFFICE.

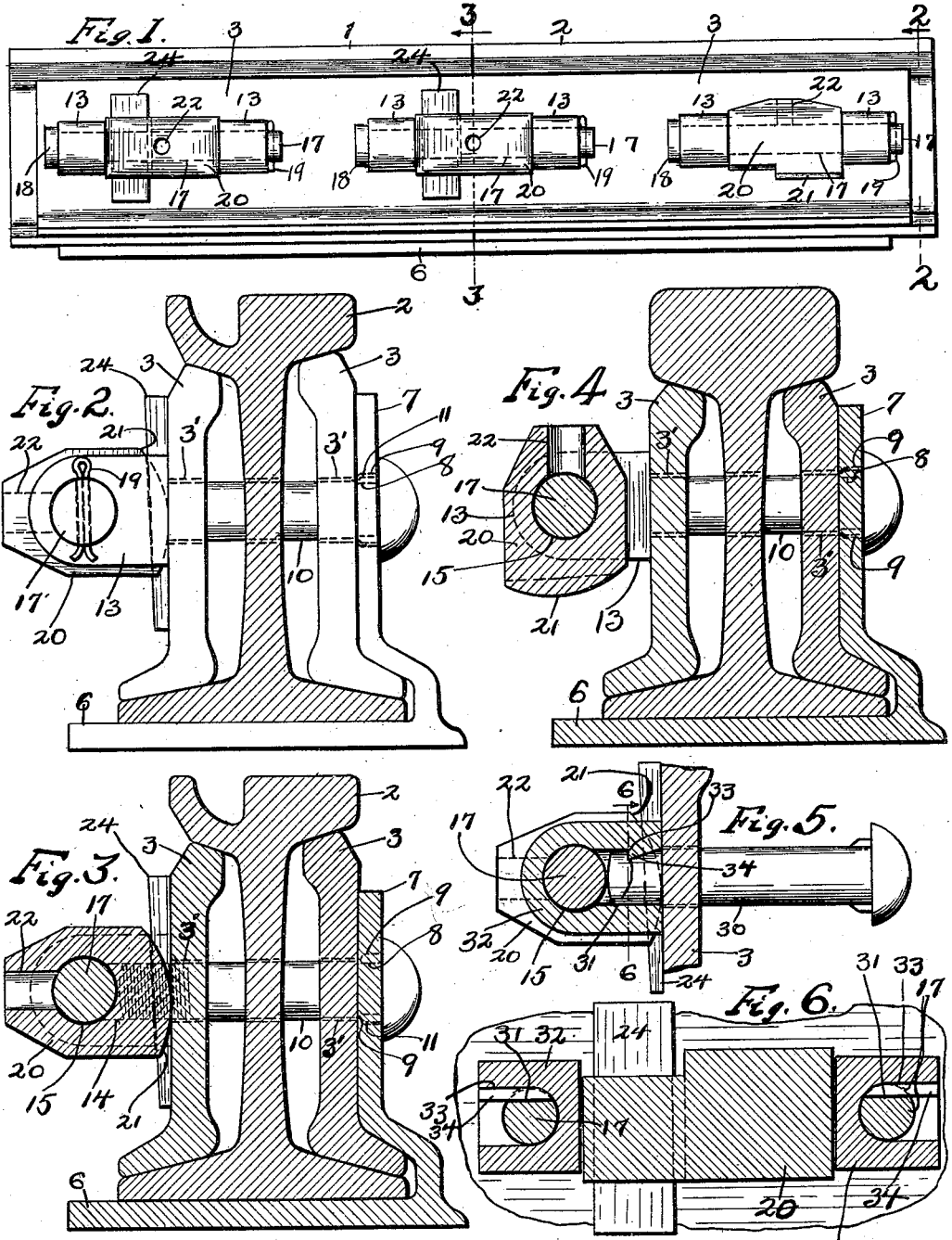
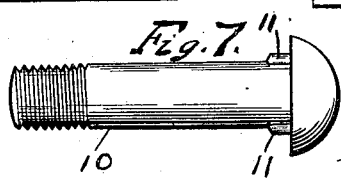

JOHN WOLFE AND MICHAEL J. KAVANAGH, OF CLEVELAND, OHIO.

RAIL-JOINT.

No. 903,124.  Specification of Letters Patent.  Patented Nov. 3, 1908.

Application filed November 14, 1907. Serial No. 402,150.

*To all whom it may concern:*

Be it known that we, JOHN WOLFE, a citizen of the United States of America, and residing at Cleveland, in the county of Cuyahoga and State of Ohio, and MICHAEL J. KAVANAGH, a citizen of the United States of America, and residing at Cleveland, in the county of Cuyahoga and State of Ohio, have invented certain new and useful Improvements in Rail-Joints; and we do hereby declare the following to be a full, clear, and exact description of the invention, such as will enable others skilled in the art to which it pertains to make and use the same.

This invention relates to new and useful improvements in rail-joints.

The object of this invention is to provide a device of this character which will form a support beneath the rail joint and which will securely clamp the ends of the rails together and, which after having been once placed in position, will be securely locked upon the rails.

Our invention, therefore, consists in the features of construction and combination of parts as described in the specification, pointed out in the claims and illustrated in the accompanying drawings.

In the accompanying drawings Figure 1 is a view in elevation of a rail joint embodying our invention. Fig. 2 is a section on line 2—2, Fig. 1. Fig. 3 is a section on line 3—3, Fig. 1. Fig. 4 is a section similar to Fig. 2 but showing different style of rail and the cam open. Fig. 5 is a detail sectional view showing a modified construction. Fig. 6 is a section on line 6—6, Fig. 5. Fig. 7 is a view of one of the screw-threaded bolts detached.

Again referring to the drawings 1 and 2 represent grooved rails of the usual construction with their ends abutting to form a joint. At each side of the rail is arranged a fish plate 3 which is provided with the usual bolt holes 3'. Beneath the rail joint and extending preferably the full length of the fish plates is arranged a bridge plate 6. The bridge plate 6 has formed integral therewith, at one side, a flange 7 which extends over the lower flange of the adjacent fish plate and along the side thereof. In the flange 7 are arranged bolt holes 8 which have recesses 9 communicating therewith. Two pairs of bolts 10 are preferably provided for each set of fish plates and, as shown in Figs. 1 to 4 inclusive and in Fig. 7, these bolts are of the type generally known as track bolts, which are screw-threaded at their ends and are provided with fins 11 on their shanks below their heads. The bolts are passed through the flange 7 and through the rails and the fish plates and where the bolts pass through the flange 7 the fins 11 thereon enter the recesses 9 and prevent the bolts from turning.

The bolts are provided with nuts or blocks 13 and each nut 13 has the usual screw-threaded opening 14 for receiving the screw-threaded end of the bolt and also an opening or bore 15 which is arranged at a right angle to the opening 14. Through the bores 15 of each pair of nuts is passed a small shaft 17 and to prevent longitudinal movement of the shaft 17 it is preferably provided at one end with a head 18 and a cotter pin 19 is passed through the opposite end thereof. On the shaft 17, between each pair of nuts 13, is rotatably mounted a clamping block 20 which has a cam face 21 arranged to abut against the adjacent fish plate when in its operative position. An opening 22 is preferably formed in the block 20 for receiving a tool, such as a rod or a crow-bar, by means of which the block 20 can be rotated and jammed into position. The cam face 21 of the block 20 is cut away near one end thereof so as to form a flat surface which will be approximately parallel with the face of the adjacent fish plate when the clamping block 20 is in its operative position. A wedge shaped key 24 is provided which is inserted between the flat spot on the cam face of the block and the fish plate and thereby locks the block against movement.

When assembling the joints the nuts 13 are screwed onto the bolts in the usual manner so as to tightly clamp the members of the joint together. After the nuts have been drawn as tight as is practical a shaft 17 is passed through each pair of nuts and this of course locks the nuts on the bolts as the shafts make it impossible for the nuts to turn. When the clamping block is turned into position it acts to reinforce and sustain the joint between each pair of nuts. It will therefore be seen that the device combines all the advantages of an individual nut lock for each bolt and in addition provides a powerful clamping and reinforcing means.

In Figs. 5 and 6 is shown a modified form of a bolt and nut which may be used in connection with this device. In this construction the bolt, indicated by 30, is not screw-threaded but in one side, near the lower end thereof, is formed a recess 31. The nut 32 instead of being provided with the usual screw-threaded opening is cut away forming a recess 33 which extends inwardly from one side of the nut and upwardly from the bottom of the nut so that the nut instead of being moved up longitudinally on the end of the bolt is shoved on sidewise. In the recess 33 is formed a shoulder 34 which is adapted to enter the recess 31 in the end of the bolt and thereby prevent the bolt from being drawn out of the recess 33.

In assembling the device with this form of bolt and nut the bolt is passed through the fish plates and the rail in the usual manner and the nut is then slipped sidewise on the end of the bolt, the nut being slipped on from the side adjacent to the clamping block so that when the block is placed in position the nut cannot move sidewise off of the end of the bolt. This form of nut and bolt forms an absolutely perfect lock and at the same time the clamping block can be drawn very close as there are no threads that might be stripped as in an ordinary nut and bolt.

As illustrated in the drawings we have shown the clamping block supported on a shaft between two nuts, it will be readily understood however that this arrangement can be varied, as for instance, two blocks can be mounted on a single shaft passing through three nuts, one block being arranged at each side of the center nut, or two blocks can be supported on a single nut on one shaft, the cams being arranged at each side of the nut or a single block can be arranged to straddle a nut.

What we claim is,—

1. In a device of the character indicated, the combination with two rails arranged to form a joint, of fish plates arranged at each side of said joint and means for clamping said fish plates to the rails comprising one or more clamping devices, each consisting of a pair of bolts arranged to pass through said rails and said fish plates, nuts arranged on the ends of said bolts, a shaft mounted in and extending between said nuts, and a block provided with a cam face rotatably mounted on said shaft.

2. In a device of the character indicated the combination with two rails arranged to form a joint, of fish plates arranged at each side of said joint and means for clamping said fish plates to the rails comprising one or more clamping devices, each consisting of a pair of bolts arranged to pass through said rails and said fish plates, nuts arranged on the ends of said bolts, a shaft mounted in and extending between said nuts, a block provided with a cam face rotatably mounted on said shaft and means for locking said block against movement when the cam face is in contact with the adjacent fish plate.

3. In a device of the character indicated the combination with two rails arranged to form a joint, of fish plates arranged at each side of said joint, and devices for clamping said fish plates to the rails comprising bolts passing through said fish plates and said rails and cam-faced blocks rotatably secured on the ends of said bolts so that when in their operative position the cam faces thereof will be in contact with the adjacent joint member.

4. In a device of the character indicated the combination with two rails arranged to form a joint, of fish plates arranged at each side of said joint and means for clamping said fish plates to the rails comprising one or more clamping devices each consisting of a pair of bolts arranged to pass through said rails and said fish plates, means arranged on said bolts to prevent their turning, nuts arranged on the ends of said bolts, a shaft mounted in and extending between said nuts, a block provided with a cam face rotatably mounted on said shaft and means for locking said block against movement when the cam face is in contact with the adjacent fish plate.

5. In a device of the character indicated the combination with two rails arranged to form a joint, of fish plates arranged at each side of said joint, a bridge plate arranged beneath said joint and provided with an integral flange which extends over the flange on one side of the rail and on one of the fish plates and laps over the said fish plate and means for clamping said flange and said fish plates to the rails comprising one or more clamping devices, each consisting of a pair of bolts arranged to pass through said rail and said fish plates, means arranged on said bolts to prevent their turning, nuts arranged on the ends of said bolts, a shaft mounted in and extending between said nuts, a block provided with a cam face rotatably mounted on said shaft and means for locking said block against movement when the cam face is in contact with the adjacent fish plate.

6. In a device of the character indicated the combination with two rails arranged to form a joint, of fish plates arranged at each side of said joint and means for securing said fish plates to said rails, consisting of a bolt arranged to pass through said fish plates, means for preventing the bolt from turning in the fish plate, a nut, a block provided with a cam face rotatably supported on said nut and means for locking said cam against movement when the cam face thereof is in contact with the adjacent fish plate.

7. In a device of the character indicated the combination with two rails arranged to form a joint, of fish plates arranged at each side of said joint and means for clamping said plates to said rails, said means comprising a series of bolts arranged to extend through said plates and said rails, fins arranged on said bolts to prevent said bolts from turning in their bolt holes, nuts secured on the end of said bolts, blocks rotatably supported on said nuts and provided with cam faces arranged to come in contact with the adjacent plate and a locking key arranged to extend between the cam block and the plate to prevent the block from moving.

8. In a device of the character indicated the combination with two rails arranged to form a joint, of fish plates arranged at each side of said rails at said joint and a locking device for securing said fish plates to said rails comprising a bolt arranged to extend through the fish plates and the rails, said bolt having a recess near the end thereof, a nut having an opening in the bottom and a shoulder formed in said opening in said nut and arranged to enter the recess in said bolt.

9. In a device of the character indicated the combination with two rails arranged to form a joint, of fish plates arranged at each side of said rails at said joint and a locking device for securing said fish plates to said rails comprising a bolt arranged to extend through the fish plates and the rails, said bolt having a recess near the end thereof, a nut having an opening in the bottom and side thereof arranged to receive the end of said bolt and a shoulder formed in the opening in said nut and arranged to enter the recess in said bolt.

10. In a device of the character indicated the combination with two rails arranged to form a joint, of fish plates arranged at each side of said rails at said joint and a locking device for securing said fish plates to said rails, each device comprising a pair of bolts arranged to extend through the fish plates and the rails, each bolt having a recess near the end thereof, a nut having an opening in the bottom and side thereof arranged to receive the end of said bolt and a shoulder formed in the opening in said nut and arranged to enter the recess in said bolt, a cam faced block rotatably supported between said nuts and means for locking the block against rotation when the cam face of the block is in contact with the adjacent fish plate.

11. In a device of the character indicated, the combination with two rails arranged to form a joint of a plate arranged to span said joint, bolts passing through said plate and said rails, means for securing said bolts in their operative position and cam-faced blocks rotatably secured on the ends of said bolts adjacent to said plate so that the cam faces thereof will come in contact with said plate.

12. In a device of the character indicated, the combination with two rails arranged to form a joint of a plate arranged to span said joint, and means for securing said plate to said rails consisting of bolts arranged to pass through said plate and said rails, means for securing each bolt in its operative position, and a block provided with a cam face rotatably supported on said bolt adjacent to said plate so that the cam face thereof will come in contact with said plate.

Signed by us at Cleveland, Ohio, in the presence of two witnesses.

JOHN WOLFE.
MICHAEL J. KAVANAGH.

Witnesses:
VICTOR C. LYNCH,
N. L. McDONNELL.